Patented Apr. 6, 1937

2,075,868

UNITED STATES PATENT OFFICE 2,075,868

GERMINAL GLAND HORMONE DERIVATIVES OF THE FORMULA $C_{18}H_{28}O_2$ AND METHOD OF MAKING SAME

Walter Schoeller, Berlin-Westend, and Friedrich Hildebrandt, Hohen Neuendorf, near Berlin, Germany, and Erwin Schwenk, New York, N. Y., assignors to Schering-Kahlbaum A. G., Berlin, Germany No Drawing. Application October 24, 1933, Serial No. 694,998. In Germany, October 27, 1932

4 Claims. (Cl. 260—131)

This invention relates to hormones and more particularly to derivatives of germinal gland hormones of the formula $C_{18}H_{28}O_2$ and methods of making same. The structural formula thereof is probably as follows:

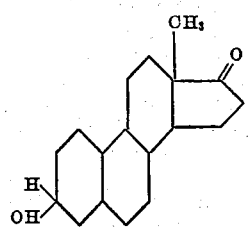

It is an object of this invention to provide means whereby derivatives of germinal gland hormones of the formula $C_{18}H_{28}O_2$ are obtained by using reduction products of follicle hormones and follicle hormone hydrates as starting materials said reduction products having the structural formula:

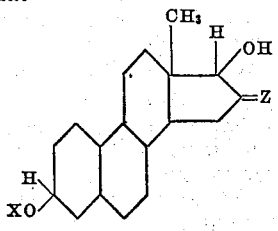

wherein X represents hydrogen or an acyl group and Z represents the

or the

group, and subjecting the latter to an oxidizing or a dehydrating or a first oxidizing, then reducing treatment, in the case of the acylderivatives followed by or combined with a saponifying treatment.

The term reduction products of follicle hormones and follicle hormone hydrates, having the structural formula

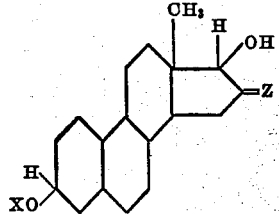

wherein X represents either hydrogen or an acyl group and Z represents the

or the

group, includes for instance, those products which are obtained by hydrogenating the follicle hormones, such as the hormone of the formula $C_{18}H_{22}O_2$, and having most probably the following structural formula:

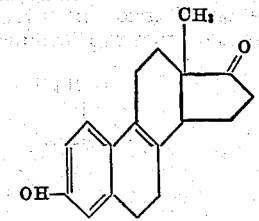

Their production is described in our co-pending application Serial No. 694,688, filed October 21, 1933.

Other products suitable for the purposes of this invention are those described by Butenandt, Stoermer and Westphal in Zeitschrift für physiologische Chemie, vol. 208, page 171. These authors obtained, for instance, a hexahydrohormone hydrate of the formula $C_{18}H_{30}O_3$ by hydrogenation of the hormone hydrate $C_{18}H_{24}O_3$ (oestrin) by means of hydrogen and platinum oxide. The compound $C_{18}H_{30}O_3$ has most probably the following structural formula:

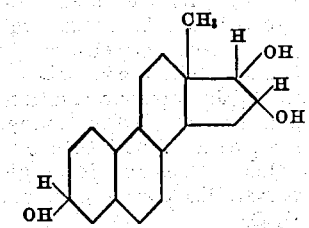

Or those derivatives of hydrogenation products of follicle hormones of the formula $C_{18}H_{28}(OH)_2$ which has most probably the following structural formula:

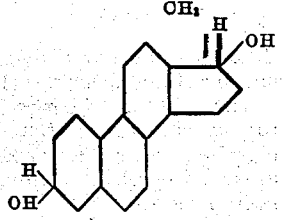

may be used in which one of the two alcohol groups is protected against the attack of the oxidation agent, for instance by esterification.

The derivatives of germinal gland hormones of the formula $C_{18}H_{28}O_2$, obtained by the above described methods, represent new hydroxyketones which exhibit a very remarkable effect upon the growth of the capon comb. Thus, this invention enables one to transform the female germinal gland hormones into substances which are very similar to the male germinal gland hormones.

The following examples serve to illustrate this invention, without however limiting it to them.

Example 1

1 part of finely pulverized hexahydrohormone-hydrate of the formula $C_{18}H_{30}O_3$ whose structural formula is

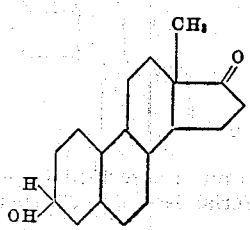

is suspended in 30 parts of a 5% sulfuric acid. The mixture is allowed to boil for 10 hours whereafter it is worked up. A compound of the formula $C_{18}H_{28}O_2$ is obtained which has most probably the following structural formula:

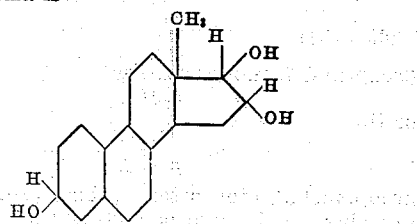

Other dehydrating agents may be used instead of sulfuric acid, such as other acids, alkalies, or acid or basic salts, or the like. The water is split off only between the two neighboring hydroxy groups while the third hydroxy group is not affected.

Example 2

1 part of hexahydrohormone hydrate is fused with 5 parts of phthalic acid anhydride at 130–140° C. for 5 hours. The fused mass is then extracted with ether, the ethereal solution is thoroughly shaken with soda solution and the portion contained in the soda solution is decomposed by saponification. After cooling, the alkaline solution is extracted with ether. On evaporation the ether, a residue is obtained which yields on recrystallization a compound of the formula $C_{18}H_{28}O_2$.

Instead of phthalic acid anhydride, other anhydrides or acid halogenides may be used giving the same reaction products.

Example 3

1 part of hexahydrohormone hydrate is dissolved in concentrated sulfuric acid of 90%. After allowing the solution to stand for 15 minutes, the strongly colored reaction mixture is poured on ice. The raw product obtained thereby is recrystallized, whereby a compound of the formula $C_{18}H_{28}O_2$ is obtained.

Example 4

1 gram of the reduction product of the follicle hormone $C_{18}H_{30}O_2$ whose structural formula is

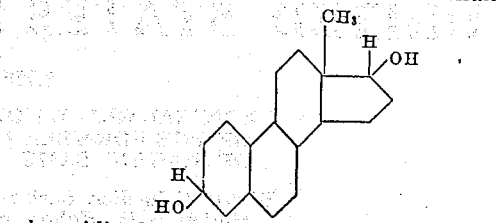

is oxidized at 60° C. by means of an excess of chromic acid and sulfuric acid. Thereby a diketone of the formula $C_{18}H_{26}O_2$ is obtained which has most probably the following structural formula:

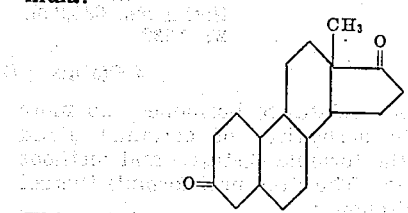

This product, without further purification, is dissolved in alcohol or glacial acetic acid, a platinum oxide catalyst is added to the solution and hydrogen is passed through the latter until two atoms of hydrogen are absorbed. After filtering off the catalyst, water is added to the filtrate. Thereby a crystalline mass is precipitated which is purified by recrystallization from diluted alcohol. The ketoalcohol of the formula $C_{18}H_{28}O_2$ is obtained in white crystals.

Other oxidation agents may be used which are capable of oxidizing the octahydrofollicle hormone $C_{18}H_{30}O_2$ which contains two secondary alcohol groups to the corresponding diketone $C_{18}H_{26}O_2$.

The reduction of the latter may be carried out not only by means of catalytically activated hydrogen, but also by means of hydrogen activated in another manner, for instance, by atomic hydrogen or hydrogen in statu nascendi, or the like.

Example 5

1 gram of finely pulverized octahydrofollicle hormone of the formula $C_{18}H_{30}O_2$ is oxidized in aqueous suspension by the addition of potassium permanganate in an amount which exceeds the theoretically required amount by 10%. The mixture of reaction products obtained thereby is purified by recrystallization. On fractionated crystallization two isomeric products of the formula $C_{18}H_{28}O_2$ are obtained.

Other gentle oxidizing agents may be used instead of permanganate. It has only to be taken care that merely one alcoholic hydroxyl group is oxidized to the keto group, yielding the keto-alcohols $C_{18}H_{28}O_2$.

Example 6

1 gram of the monobenzoate of the octahydrofollicle hormone of the formula $C_{18}H_{29}O(OCOC_6H_5)$ which has most probably the following structural formula:

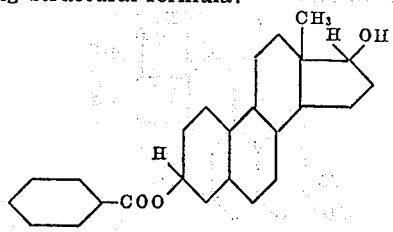

is treated at about 60° with 10 cc. of Beckmann's oxidation mixture. After the oxidation is completed, the greenish colored mixture is diluted with water and the precipitated crude reaction product is extracted by ether. After evaporation of the dried ether extract the benzoate of the ketoalcohol is obtained in white crystalline incrustations.

On saponification and successive recrystallization of the saponified product from alcohol the same compounds are obtained as described in Example 5. Of course, other acyl compounds, such as for instance the monoacetyl compounds may be subjected to the above described oxidation methods.

Various dehydrating agents capable of splitting off $H_2O$ from hormone hydrates as set forth above, are described in the book by Houben-Weyl, entitled "Die Methoden der organischen Chemie", 2nd edition, vol. 3, (1923), pages 91 and following. In the same book vol. 2, pages 41 and following, there is described oxidizing agents which are capable of tranforming alcohol groups into keto groups.

Various other changes may be made in the details disclosed in the foregoing specification, in accordance with the principles set forth herein and in the claims annexed hereto.

What we claim, is:—

1. A method of producing keto alcohols of the formula $C_{18}H_{28}O_2$ and their acyl derivatives which comprises subjecting reduction products of follicle hormones having the following structural formula

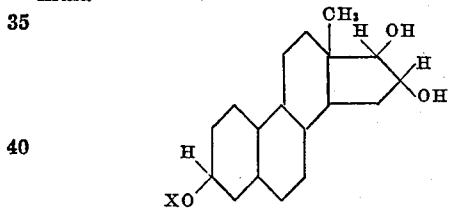

wherein the substituent groups on each of the end rings are most likely in the positions shown wherein X represents a group taken from the class consisting of hydrogen and acyl, to a treatment with a dehydrating agent adapted to split off water between the two neighboring hydroxyl groups, whereby compounds of the following structural formula

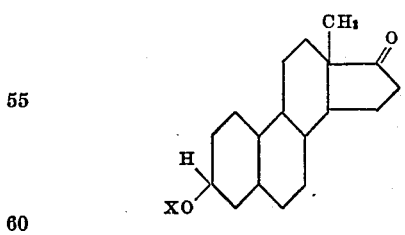

wherein the substituent groups on each of the end rings are most likely in the positions shown are obtained.

2. A method of producing keto alcohols of the formula $C_{18}H_{28}O_2$ which comprises subjecting hexahydrofollicle hormone hydrates having the following structural formula

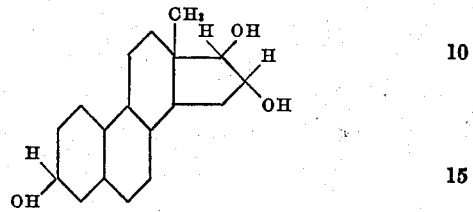

wherein the substituent groups on each of the end rings are most likely in the positions shown to the action of dehydrating agents so as to split off water between the two neighboring hydroxyl groups of said hexahydrofollicle hormone hydrates.

3. A method of producing keto alcohols of the formula $C_{18}H_{28}O_2$ which comprises subjecting hexahydrofollicle hormone hydrates having the following structural formula

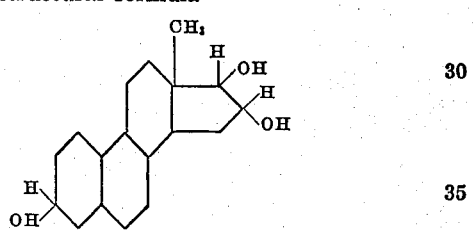

wherein the substituent groups on each of the end rings are most likely in the positions shown to the action of acid anhydrides so as to split off water between the two neighboring hydroxyl groups of said hexahydrofollicle hormone hydrates.

4. A product having the following structural formula:

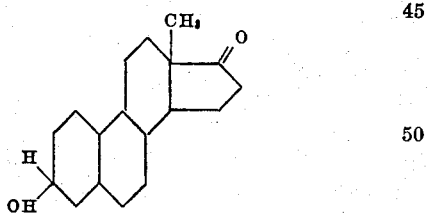

wherein the substituent groups on each of the end rings are most likely in the positions shown.

WALTER SCHOELLER.
FRIEDRICH HILDEBRANDT.
ERWIN SCHWENK.